United States Patent
Tabuchi

(10) Patent No.: US 11,163,570 B2
(45) Date of Patent: Nov. 2, 2021

(54) INFORMATION PROCESSING APPARATUS, NON-TRANSITORY COMPUTER-READABLE MEDIUM, AND INFORMATION PROCESSING METHOD

(71) Applicant: FUJITSU LIMITED, Kawasaki (JP)

(72) Inventor: Akihiro Tabuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 16/751,223

(22) Filed: Jan. 24, 2020

(65) Prior Publication Data
US 2020/0249945 A1  Aug. 6, 2020

(30) Foreign Application Priority Data
Feb. 1, 2019 (JP) .............................. JP2019-016819

(51) Int. Cl.
  *G06F 9/30* (2018.01)
  *G06F 9/445* (2018.01)
  (Continued)

(52) U.S. Cl.
  CPC ...... *G06F 9/30181* (2013.01); *G06F 9/30003* (2013.01); *G06F 9/3836* (2013.01);
  (Continued)

(58) Field of Classification Search
  CPC ............. G06F 9/30181; G06F 9/30003; G06F 9/3836; G06F 9/485; G06F 9/3806;
  (Continued)

(56) References Cited

U.S. PATENT DOCUMENTS 4,539,684 A * 9/1985 Kloker .................... H04L 7/048
  714/788
4,887,235 A * 12/1989 Holloway ............... G06F 8/312
  711/216
(Continued)

FOREIGN PATENT DOCUMENTS

JP           11-73327 A     3/1999
JP        2001-350632 A    12/2001

OTHER PUBLICATIONS

Paul Chow, RISC (Reduced Instruction Set Computers), 1991 IEEE, [Retrieved on Jul. 20, 2021], Retrieved from the internet: <URL: https://ieeexplore.ieee.org/stamp/stamp.jsp?arnumber=127642> 4 Pages (28-31) (Year: 1991).*

(Continued)

*Primary Examiner* — Anibal Rivera
(74) *Attorney, Agent, or Firm* — Fujitsu Patent Center

(57) ABSTRACT

An information processing apparatus includes: a memory; and a processor configured to: acquire an instruction sequence including plural instructions; generate plural candidates of new instruction sequences capable of obtaining an execution result as same as in the instruction sequence, by replacing at least a part of plural nop instructions included in the instruction sequence with a wait instruction that waits for completion of all preceding instructions; delete any one of the nop instructions and the wait instruction from each of the new instruction sequences, when the execution result does not change in case any one of the nop instructions and the wait instruction is deleted from the new instruction sequences in the candidates; and select a one candidate among the candidates subjected to the delete, the one candidate including the number of instructions equal to or less than a certain number, and having a smallest number of execution cycles.

7 Claims, 15 Drawing Sheets

(51) Int. Cl.
*G06F 9/38* (2018.01)
*G06F 9/48* (2006.01)
*G06F 9/32* (2018.01)
*G06F 8/30* (2018.01)
*G06F 8/65* (2018.01)

(52) U.S. Cl.
CPC .............. *G06F 9/485* (2013.01); *G06F 8/312* (2013.01); *G06F 8/66* (2013.01); *G06F 9/328* (2013.01); *G06F 9/3806* (2013.01)

(58) Field of Classification Search
CPC . G06F 9/328; G06F 8/66; G06F 8/312; G06F 8/443; G06F 30/33; G06F 11/1641; G06F 9/38; G06F 9/30072
See application file for complete search history.

(56) References Cited

U.S. PATENT DOCUMENTS

| | | | | | |
|---|---|---|---|---|---|
| 4,922,414 | A | * | 5/1990 | Holloway | G06F 8/312 711/207 |
| 6,047,004 | A | * | 4/2000 | Koyama | H04N 21/4302 370/509 |
| 6,351,822 | B1 | * | 2/2002 | Wright | G06F 8/66 712/E9.062 |
| 7,225,445 | B1 | * | 5/2007 | Kobayashi | G06F 3/1208 358/1.9 |
| 7,603,604 | B2 | * | 10/2009 | Yamada | G01R 31/31813 714/738 |
| 2003/0093256 | A1 | * | 5/2003 | Cavanagh | G06F 30/33 703/14 |
| 2003/0093257 | A1 | * | 5/2003 | Cavanagh | G06F 30/33 703/14 |
| 2003/0093569 | A1 | * | 5/2003 | Sivier | G06F 30/33 709/248 |
| 2004/0162717 | A1 | * | 8/2004 | Nouri | G06F 30/33 703/17 |
| 2005/0028149 | A1 | * | 2/2005 | Takita | G06F 8/4432 717/150 |
| 2007/0283061 | A1 | * | 12/2007 | Mueller | G06F 11/1641 710/105 |
| 2011/0022873 | A1 | * | 1/2011 | Drexler | G06F 1/3228 713/401 |
| 2013/0111189 | A1 | * | 5/2013 | Boehl | G06F 1/04 712/29 |
| 2015/0272509 | A1 | * | 10/2015 | Kwon | A61B 5/7267 600/518 |
| 2015/0339122 | A1 | * | 11/2015 | Chehaibar | G06F 9/30072 712/226 |
| 2016/0132331 | A1 | * | 5/2016 | Godard | G06F 9/3806 711/137 |
| 2018/0107510 | A1 | * | 4/2018 | Carlough | G06F 9/38 |
| 2019/0303168 | A1 | * | 10/2019 | Fleming, Jr. | G06F 15/8023 |

OTHER PUBLICATIONS

Keun Soo Yim et al., A Fault-Tolerant Programmable Voter for Software-Based N-Modular Redundancy, 2012 IEEE, [Retrieved on Jul. 20, 2021], Retrieved from the internet: <URL: https://ieeexplore.ieee.org/stamp/stamp.jsp?arnumber=6187253> 20 Pages (1-20) (Year: 2012).*

Furber, S. B., "VLSI Rise Architecture and Organization," CRC Press, Mar. 31, 1989, Relevant part only, 1 page.

Texas Instruments,"TMS320C64x/C64x+ DSP CPU and Instruction Set Reference Guide," Literature No. SPRU732J, Jul. 2010, 686 pages.

Dupont De Dinechin, Benoit, "Inter-Block Scoreboard Scheduling in a JIT Compiler for VLIW Processors," Technical Report A/392/CRI, Euro-Par 2008—Parallel Processing, pp. 370-381, Aug. 26-29, 2008.

Extended European Search Report dated Jun. 22, 2020 for corresponding European Patent Application No. 20151710.9, 13 pages.

MIPS Technologies, Inc., "MIPS32 Architecture for Programmers, vol. II: The MIPS32 Instruction Set," Document No. MD00086 Revision 0.95, Mar. 12, 2001, XP0002364610, 253 pages.

Allen, Randy, "Exploiting Multiple Granularities of Parallelism in a Compiler," Compcon Spring '90: Thirty-Fifth IEEE Computer Society International Conference Intellectual Leverage, vol. CONF. 35, pp. 634-640, Feb. 26, 1990, XP000163757.

Zhai, Antonia et al., "Compiler and Hardware Support for Reducing the Synchronization of Speculative Threads," ACM Transactions on Architecture and Code Optimization, vol. 5, No. 1, pp. 1-33, May 29, 2008, XP058106219.

Maisuradze, Giorgi et al., "SPECULOSE: Analyzing the Security Implications of Speculative Execution in CPUs," Arxiv.org, Cornell University Library, pp. 1-15, Jan. 12, 2018, XP080852425.

* cited by examiner

FIG. 2

| | INSTRUCTION SEQUENCE 1 | INSTRUCTION SEQUENCE 2 |
|---|---|---|
| THE NUMBER OF INSTRUCTIONS | 5 | 4 |
| THE NUMBER OF EXECUTION CYCLES | 5 | 6 |

FIG. 10

| | CANDIDATE P1 | CANDIDATE P2 | CANDIDATE P3 |
|---|---|---|---|
| THE NUMBER OF INSTRUCTIONS | 5 | 8 | 5 |
| THE NUMBER OF EXECUTION CYCLES | 10 | 9 | 10 |

60

```
%xor_xy = ixors %x, %y
%and_xy = iands %x, %y
nop
nop
nop
nop
nop
nop
%srl_xor_xy = isrls %xor_xy, 1
nop
nop
nop
nop
nop
%res = iadds %and_xy, %srl_xor_xy
```

FIG. 14A

PRESENT EMBODIMENT

```
rep 11, 128
%xor = ixors %x, %y
%and = iands %x, %y
nop
nop
nop
nop
nop
%srl_xor = isrls %xor, 1
wait
%res = iadds %and, %srl_xor
```
⎯ 71

FIG. 14B

FIRST COMPARATIVE EXAMPLE

```
rep 6, 128
%xor = ixors %x, %y
%and = iands %x, %y
wait
%srl_xor = isrls %xor, 1
wait
%res = iadds %and, %srl_xor
```
⎯ 72

FIG. 14C

SECOND COMPARATIVE EXAMPLE

```
LoopBegin: // LABEL (NON-INSTRUCTION)
%xor = ixors %x, %y
%and = iands %x, %y
%loop_cnt = sub %loop_cnt, 1
nop
nop
nop
nop
%srl_xor = isrls %xor, 1
nop
nop
nop
nop
nop
%res = iadds %and, %srl_xor
%baseadr = add %baseadr, %inc
bnzr %loop_cnt, LoopBegin
```
⎯ 73

FIG. 15

| ITEM | | PRESENT EMBODIMENT (INSTRUCTION SEQUENCE 71) | FIRST COMPARATIVE EXAMPLE (INSTRUCTION SEQUENCE 72) | SECOND COMPARATIVE EXAMPLE (INSTRUCTION SEQUENCE 73) |
|---|---|---|---|---|
| THE NUMBER OF INSTRUCTIONS | | 11 | 6 | 17 |
| THE NUMBER OF EXECUTION CYCLES | OTHER THAN wait and bnzr | 19 | 22 | 22 |
| | wait | 10 | 4 | 18 |
| | | 9 | 9×2 | - |
| | bnzr | - | - | 4 |

INFORMATION PROCESSING APPARATUS, NON-TRANSITORY COMPUTER-READABLE MEDIUM, AND INFORMATION PROCESSING METHOD

CROSS-REFERENCE TO RELATED APPLICATION

This application is based upon and claims the benefit of priority of the prior Japanese Patent Application No. 2019-016819 filed on Feb. 1, 2019, the entire contents of which are incorporated herein by reference.

FIELD

A certain aspect of the embodiments is related to an information processing apparatus, a non-transitory computer-readable medium and an information processing method.

BACKGROUND

There is a pipeline system as a system for increasing the throughput of instructions in a processor. In the pipeline system, an execution stage of the instruction is divided into respective stages such as instruction fetch, instruction decode, instruction execution, memory reference, and write back to a register. Then, a plurality of instructions are sequentially input to respective stages, so that the plurality of instructions are executed in parallel in the processor, and the execution time of a program is reduced.

In the pipeline system, various hazards that lead a cause for not obtaining a correct execution result may occur. One of the hazards is a data hazard. The data hazard is a hazard in which even though a preceding instruction does not written a result to a register yet, a subsequent instruction that uses the result of the preceding instruction reads the register.

One of the methods for avoiding the data hazard is called a forwarding. The forwarding is a technique for supplying a result of the previous instruction to the subsequent instruction before the previous instruction writes the result to the register. Although the data hazard is eliminated in this technique, there is a need for providing a wiring in the processor to perform the forwarding, which in turn complicates the hardware structure of the processor.

There is also a method of avoiding the data hazard by stalling the pipeline without performing the forwarding. The stall is a technique in which a nop (no operation) instruction is inserted between the preceding instruction and the succeeding instruction, so that the succeeding instruction is not input into the pipeline until the preceding instruction writes the result in a register. Note that the technique related to the present disclosure is also disclosed in Japanese Laid-open Patent Publications Nos. 11-073327 and 2001-350632.

SUMMARY

According to an aspect of the present disclosure, there is provided an information processing apparatus including: a memory; and a processor coupled to the memory and the processor configured to: acquire an instruction sequence including a plurality of instructions; generate a plurality of candidates of new instruction sequences capable of obtaining an execution result as same as in the instruction sequence, by replacing at least a part of a plurality of nop instructions included in the instruction sequence with a wait instruction that waits for completion of all preceding instructions; delete any one of the nop instructions and the wait instruction from each of the new instruction sequences, when the execution result does not change in case any one of the nop instructions and the wait instruction is deleted from the new instruction sequences in the candidates; and select a one candidate among the plurality of candidates subjected to the delete, the one candidate having the number of instructions equal to or less than a certain number, and having a smallest number of execution cycles among the plurality of candidates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating the number of instructions and the number of execution cycles in each of the instruction sequences in FIGS. 1A and 1B;

FIG. 10 is a diagram illustrating the number of execution cycles and the number of instructions obtained for each candidate in the present embodiment;

FIG. 14A is a diagram illustrating an instruction sequence in which the number of instructions is reduced by applying the present embodiment to the instruction sequence of FIG. 13A;

FIG. 14B is a diagram illustrating an instruction sequence according to a first comparative example;

FIG. 14C is a diagram illustrating an instruction sequence according to a second comparative example; and FIG. 15 is a diagram illustrating the number of instructions included in each of the instruction sequences according to the present embodiment, the first comparative example and the second comparative example, and the number of execution cycles when each of the instruction sequences has been executed once.

DESCRIPTION OF EMBODIMENTS

Prior to the description of the present embodiment, matters studied by an inventor will be described.

A pipeline may be stalled in order to avoid the data hazard without employing the forwarding which leads to complicated hardware structure. The stall is a technique for temporarily stopping the pipeline, and can be realized by inserting an no operation instruction (hereinafter referred to as "a nop instruction") between a preceding instruction and a succeeding instruction. The nop instruction is an instruction that does not change the contents of pipeline registers, a register file, a main memory, and the like. In a stage where the nop instruction exists, the contents of each of the registers and the main memory described above do not change, and the stall which stops the pipeline can therefore be executed.

However, the nop instruction completes in one clock cycle after the nop instruction is issued. Therefore, the number of nop instructions is required to become as many as the number of clock cycles to be stalled, and hence the number of instructions in the entire program increases.

Particularly, some instruction set includes such an instruction that provide an upper limit number for the number of the subsequent instructions. In this instruction set, the number of the subsequent instructions may exceed the upper limit number by the nop instruction. Examples of such instructions having the upper limit number include a rep instruction in the DLU architecture, and a loop instruction and a loopcc instruction in the X86 architecture.

Among these instructions, the rep instruction is an instruction that instructs repeat of the subsequent instruction, and is described in a format of "rep n, m". A first argument "n" is an integer value representing the number of instructions to be repeated. A second argument "m" is an integer value representing the number of repeats. In the DLU, an upper limit value of the first argument "n" is 12. Therefore, the rep instruction cannot repeatedly execute the subsequent instructions more than 12 instructions.

In order to reduce the number of nop instructions in the instruction sequence, the nop instructions may be replaced with a wait instruction. The wait instruction is an instruction that waits until all the preceding instructions are completed, and can stall the pipeline as in the nop instruction. Moreover, the wait instruction can stall the pipeline by one issuance. Therefore, the number of instructions can be reduced compared with the case of using the nop instruction.

However, according to a result of studies conducted by the inventor of the present application, it was clarified that the number of execution cycles in the entire instruction sequence increases rather than decreases when the nop instructions is simply replaced with the wait instruction. This will be described with reference to FIGS. 1A and 1B.

Figure 1B:
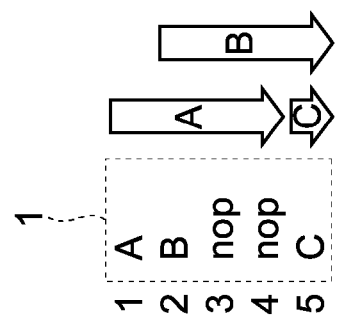
FIGS. 1A and 1B are diagrams schematically illustrating the number of execution cycles of instruction sequences.
Figure 1A:
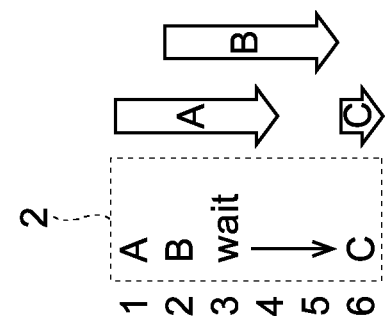

FIGS. 1A and 1B are diagrams schematically illustrating the number of execution cycles of instruction sequences.

FIG. 1A illustrates an instruction sequence 1 that stalls the pipeline by the nop instructions.

The instruction sequence 1 has three instructions A, B, and C, and is executed in order from the top to the bottom as a clock cycle advances.

It is assumed that each of the instructions A and B requires 4 clock cycles from the issuance of each instruction to the completion. It is also assumed that the instruction C depends on the instruction A, and the instruction C reads the register into which the instruction A wrote some data. Therefore, when the pipeline is not stalled between the instructions A and C, the data hazard occurs. This is also the case for an instruction sequence 2 in FIG. 1B.

In order to stall the pipeline, two nop instructions are continuously inserted between the instructions B and C in the instruction sequence 1. Here, it is assumed that the nop instruction is completed in one clock cycle.

Thereby, the instruction C starts after the instruction A is completed, and the data hazard can therefore be avoided. However, since the two nop instructions are inserted, the number of instructions included in the instruction sequence 1 becomes long as many as five.

On the other hand, FIG. 1B illustrates the instruction sequence 2 that stalls the pipeline by the wait instruction.

The wait instruction is an instruction that waits for the start of the subsequent instruction until all the preceding instructions are completed. By issuing the wait instruction only once, the function of the wait instruction can be realized. In this example, the preceding instructions for the wait instruction are the instructions A and B. Therefore, the instruction C starts after both of the instructions A and B are completed, so that the data hazard can be avoided.

In this way, since the wait instruction can stall the pipeline only by one issue, the number of instructions in the instruction sequence 2 can be reduced compared with the number of instructions in the instruction sequence 1 using the nop instructions (FIG. 1A).

However, when the wait instruction is used, 6 clock cycles are required from the start of the instruction A to the completion of the instruction C, and hence the number of execution cycles in the entire program is increased compared with the instruction sequence 1 using the nop instructions (FIG. 1A).

FIG. 2 is a table illustrating the number of instructions and the number of execution cycles in each of the instruction sequences 1 and 2 in FIGS. 1A and 1B.

As illustrated in FIG. 2, the instruction sequence 1 that stalls the pipeline only with the nop instruction has a larger number of instructions than the instruction sequence 2 that stalls the pipeline with the wait instruction. Therefore, in a program having a larger number of instructions than this example, the number of instructions may exceed the upper limit of the number of subsequent instructions that can be executed repeatedly by the rep instruction, and there is a possibility that the loop processing cannot be executed using the rep instruction.

Moreover, even when the rep instruction is not used, the memory usage increases due to an increase in the total number of instructions. Therefore, there is a possibility that an application program for a device having a small memory size such as an embedded device cannot be stored in the memory.

On the other hand, in the instruction sequence 2 that stalls the pipeline with the wait instruction, the number of instructions can be reduced compared with the instruction sequence 1.

However, the number of execution cycles increases conversely, and the execution time of the program becomes long.

Hereinafter, a description will be given of a present embodiment that can reduce the number of instructions and suppress an increase in the execution time of the program.

Present Embodiment

[Target Processor]

Figure 3:
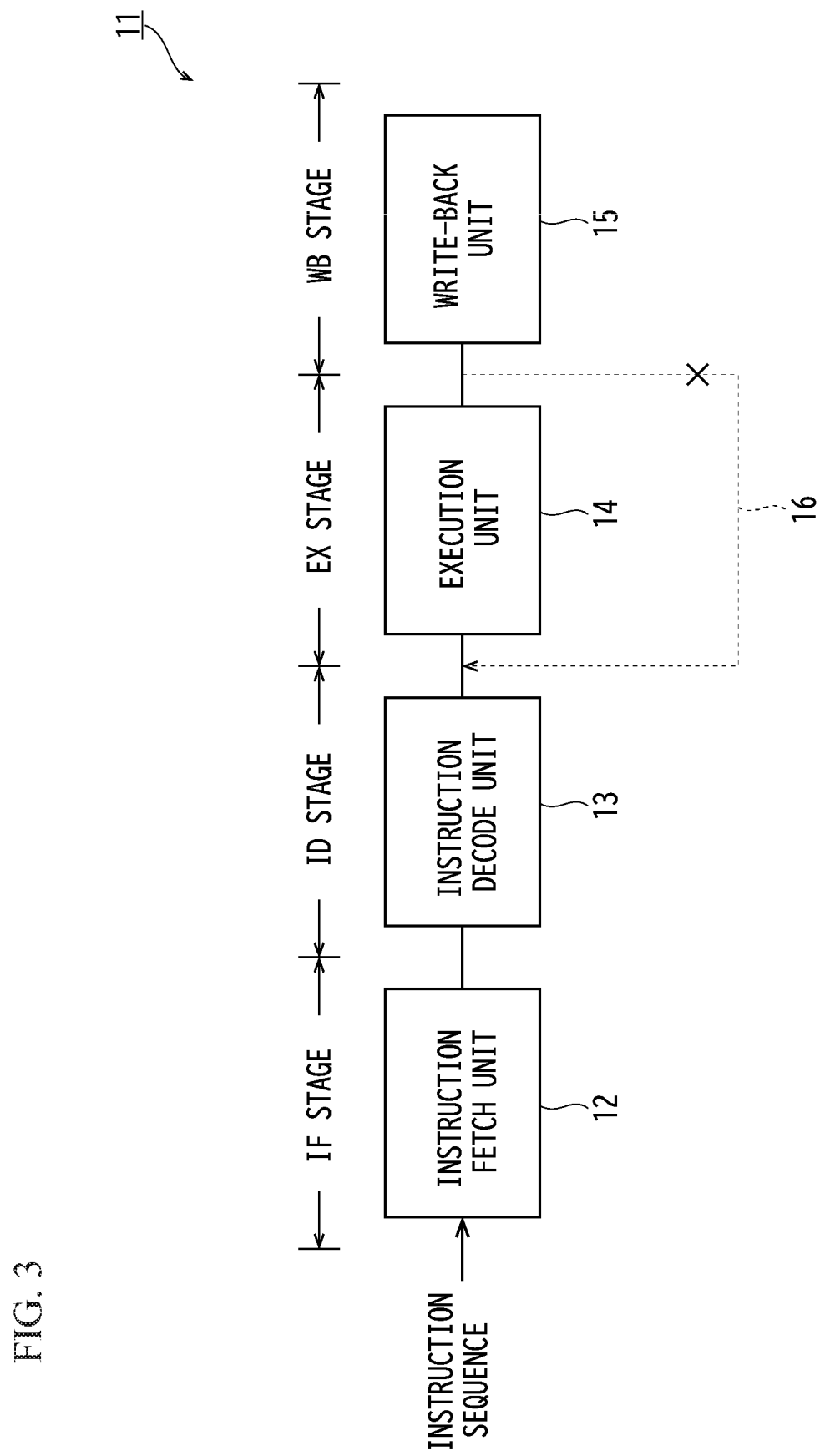
FIG. 3 is a diagram illustrating the hardware structure of a target processor according to a present embodiment.

FIG. 3 is a diagram illustrating the hardware structure of a target processor according to the present embodiment.

A target processor 11 is a processor that can execute pipeline processing to the instruction set of the above-mentioned DLU architecture, for example. Also, the target processor 11 is a processor that processes the instruction sequence by in-order execution, and the instructions are executed in order from the top of the instruction sequence.

In this example, the target processor 11 includes an instruction fetch unit 12, an instruction decode unit 13, an execution unit 14, and a write-back unit 15. These units are registers and arithmetic circuits formed on a semiconductor substrate, and correspond to stages of IF (Instruction Fetch), ID (Instruction Decode), EX (Execution), and WB (Write Back) in the pipeline processing, respectively.

The IF stage is a stage in which the instruction fetch unit 12 sequentially fetches instructions included in the instruction sequence. The ID stage is a stage in which the instruction decode unit 13 receives the instructions from the instruction fetch unit 12 and decodes the received instructions.

The EX stage is a stage in which the execution unit 14 executes arithmetic operation or logical operation in accordance with the instructions decoded by the instruction decode unit 13. Here, data to be used in these operations is written in an unillustrated register in advance.

The WB stage is a stage in which the write-back unit 15 writes back an operation result output from the execution unit 14 in the EX stage to the register file.

In the target processor 11, a forwarding line 16 for avoiding the data hazard does not exist. The forwarding line 16 is a wiring that supplies, to the EX stage, data before input to the WB stage. By omitting the wiring in this manner, the hardware structure of the target processor 11 can be prevented from being complicated.

In addition to the aforementioned DLU, other processor like MIPS R2000, MIPS R3000, and C6000 VLIW family manufactured by Texas Instruments are examples of the processors that does not have the forwarding line 16, and these processors may be used as the target processor 11.

Note that a memory reference instruction such as a store instruction is not used in order to simplify the explanation in the followings. However, when the memory reference instruction is used, a MEM stage for executing memory reference may be provided between the EX stage and the WR stage.

[Hardware Structure]

Figure 4:
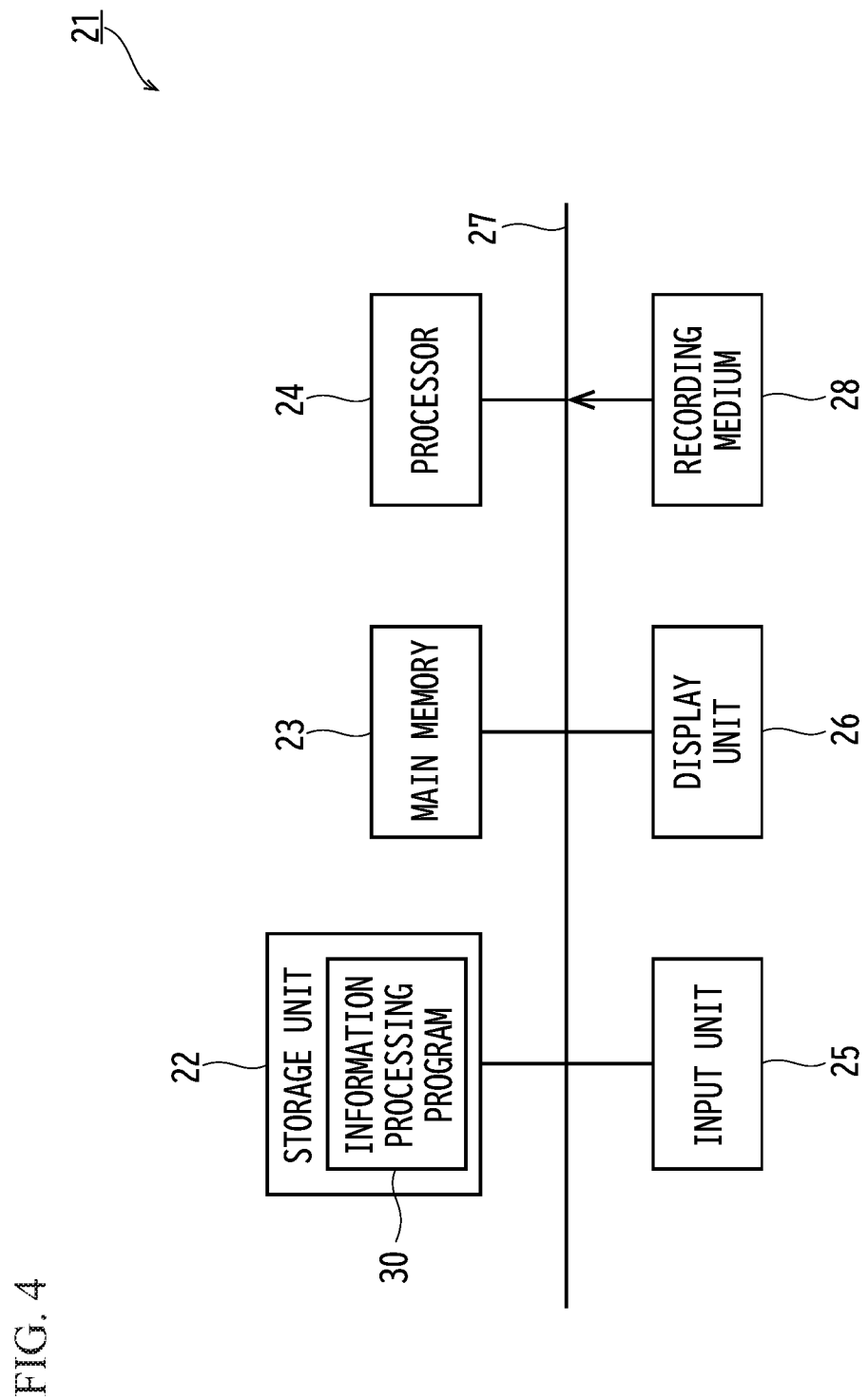
FIG. 4 is a diagram illustrating the hardware structure of an information processing apparatus according to the present embodiment.

FIG. 4 is a diagram illustrating the hardware structure of an information processing apparatus according to the present embodiment.

An information processing apparatus 21 is a computer such as a PC or a server that outputs intermediate codes of the program executed by the target processor 1 described above.

In this example, the information processing apparatus 21 includes a storage unit 22, a main memory 23, a processor 24, an input unit 25, and a display unit 26. These elements are connected to each other by a bus 27.

The storage unit 22 is a secondary storage device such as a hard disk drive (HDD) or an solid state drive (SSD), and stores an information processing program 30 according to the present embodiment. The information processing program 30 is a program for reducing the number of instructions in the input instruction sequence as described later.

Here, the information processing program 30 may be recorded on a non-transitory computer-readable recording medium 28, and the processor 24 may read the information processing program 30 on the recording medium 28.

Examples of such a recording medium 28 include a physical portable recording media such as a compact disc-read only memory (CD-ROM), a digital versatile disc (DVD), and a universal serial bus (USB) memory. A semiconductor memory such as a flash memory or a hard disk drive may be used as the recording medium 28. The recording medium 28 is not a transitory medium such as a carrier wave having no physical entity.

Moreover, the information processing program 30 may be stored in a device connected to a public line, the Internet, a LAN (Local Area Network), or the like, and the processor 24 may read the information processing program 30 from the device to execute the information processing program 30.

On the other hand, the main memory 23 is hardware that temporarily stores data such as a DRAM, and the information processing program 30 is loaded on the main memory 23.

The processor 24 is hardware such as a central processing unit (CPU) that controls each unit of the information processing apparatus 21 and executes the information processing program 30 in cooperation with the main memory 23.

In the present embodiment, it is assumed that the processor 24 different from the target processor 11 (see FIG. 3) executes the information processing program 30, but the present embodiment is not limited to this. For example, a machine including the target processor 11 may execute the information processing program 30.

The input unit 25 is an input device such as a keyboard or a mouse. When a user operates the input device, the instruction sequence to be processed by the information processing program 30 is designated, and an output destination of the processed instruction sequence is designated.

The display unit 26 is a display device such as a liquid crystal display that displays various commands used by the user when the information processing program 30 is executed.

[Functional Configuration]

Figure 5:
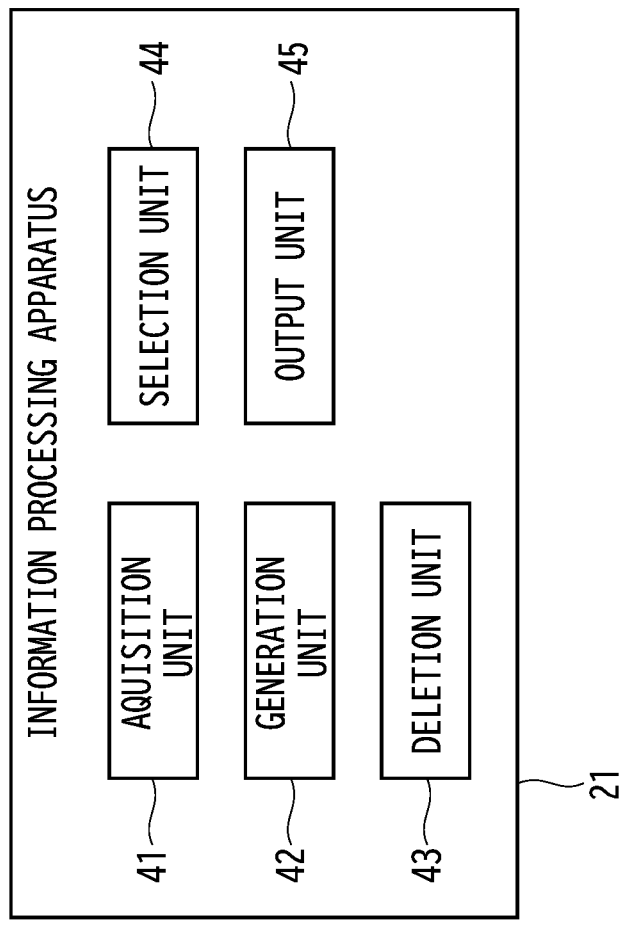
FIG. 5 is a diagram illustrating the functional configuration of the information processing apparatus according to the present embodiment.

FIG. 5 is a diagram illustrating the functional configuration of the information processing apparatus 21 according to the present embodiment.

As illustrated in FIG. 5, the information processing apparatus 21 includes an acquisition unit 41, a generation unit 42, a deletion unit 43, a selection unit 44, and an output unit 45. The processor 24 and the main memory 23 work together to execute the information processing program 30, whereby each of these units is realized.

The acquisition unit 41 is a functional unit that acquires the instruction sequence. For example, the acquisition unit 41 acquires an instruction sequence 50 illustrated in FIG. 6.

Figure 6:
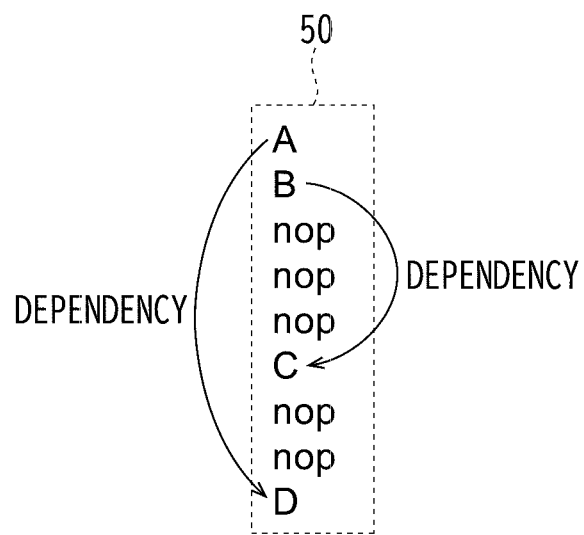
FIG. 6 is a diagram illustrating an example of an instruction sequence acquired by an acquisition unit according to the present embodiment.

FIG. 6 is a diagram illustrating an example of the instruction sequence 50 acquired by the acquisition unit 41.

The instruction sequence 50 is an intermediate code for generating a binary file to be executed by the target processor 1, and is a sequence in which an instruction A, an instruction B, an instruction C, an instruction D and nop instructions are arranged from the top in an execution order. Examples of the instructions A, B, C, and D include an arithmetic operation instruction, a logical operation instruction, a jump instruction, the memory reference instruction, and the like.

The nop instruction is an instruction for stalling the pipeline by not changing the contents of pipeline registers, the register file, the main memory, and the like, as described above. In MIPS, the nop instruction is realized by "sll $0, $0, 0" having an equivalent function to the nop instruction.

It is assumed that all these instructions are issued in one clock cycle. The number of cycles needed to complete the instruction from its issuance are as follows;
- instruction A: 8 clock cycles,
- instruction B: 4 clock cycles,
- instruction C: 1 clock cycle,
- instruction D: 1 clock cycle, and
- nop instruction: 1 clock cycle.

Further, it is assumed that the instruction D depends on the instruction A and reads the register into which the instruction A write some data. It is also assumed that the instruction C depends on the instruction B and reads the register into which the instruction B write some data.

The nop instructions are inserted into the instruction sequence 50 in order to prevent the data hazard from occurring due to such dependency in the instructions. Hereinafter, the case where the acquisition unit 41 acquires the instruction sequence 50 including the nop instructions is described as an example. However, the information processing program 30 itself may compile a source code to generate the instruction sequence 50. Since the number of instructions in the instruction sequence 50 is increased by the nop instructions as described above, the number of instructions is reduced in the present embodiment as described later.

Figure 7C:
FIGS. 7A to 7C are diagrams illustrating a generation method in which a generation unit according to the present embodiment generates candidates of the instruction sequences.
Figure 7B:
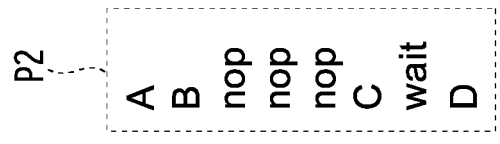
Figure 7A:

Referring to FIG. 5 again, the generation unit 42 generates a plurality of candidates of new instruction sequences having the same execution result as the above-mentioned instruction sequence 50. FIGS. 7A to 7C are diagrams illustrating a generation method of generating the candidates of the instruction sequences.

As illustrated in FIGS. 7A to 7C, three candidates P1 to P3 are generated in this example.

These candidates P1 to P3 are generated by replacing at least a part of the plurality of nop instructions in the original instruction sequence 50 with the wait instruction. As described above, the wait instruction is the instruction, by one issuance, that waits until all the preceding instructions are completed.

For example, the candidate P1 is generated by replacing three consecutive nop instructions in the instruction sequence 50 with a single wait instruction. In this case, since the instruction C starts after the instructions A and B complete, the data hazard due to the dependency between the instructions B and C does not occur. Similarly, the data hazard due to the dependency between the instructions A and D does not occur.

Also, the candidate P2 is generated by replacing two consecutive nop instructions in the instruction sequence 50 with the single wait instruction. In this case, the instruction D starts after all the preceding instructions complete. Therefore, the data hazard due to the dependency between the instructions A and D does not occur.

On the other hand, the candidate P3 is generated by replacing three consecutive nop instructions in the instruction sequence 50 with the single wait instruction, and replacing another two consecutive nop instructions in the instruction sequence 50 with another single wait instruction. In this case, the data hazard does not occur as in the candidates P1 and P2.

Note that in any of the candidates P1 to P3, when the plurality of nop instructions appear continuously, the plurality of consecutive nop instructions are replaced with the single wait instruction.

Therefore, the number of instructions in each of the candidates P1 to P3 can be reduced as compared with the case where only one of the plurality of nop instructions is replaced with the wait instruction. Furthermore, when the candidate in which only one of the nop instructions is replaced with the wait instruction is allowed, the number of candidates increases unnecessarily. However, when the consecutive nop instructions are collectively replaced with the wait instruction as in this example, the increase in the number of candidates can be suppressed.

Note that the candidates P1 to P3 are obtained by simply replacing the consecutive nop instructions with the wait instruction in the original instruction sequence 50. Thus, there is room for these candidates P1 to P3 to reduce the number of instructions.

Therefore, the deletion unit 43 (see FIG. 5) deletes an unnecessary nop instruction and unnecessary wait instruction from each of the candidates P1 to P3.

Figure 8C:
FIGS. 8A to 8C are diagrams illustrating a method in which a deletion unit according to the present embodiment deletes a nop instruction and a wait instruction from the instruction sequences of the candidates.
Figure 8B:
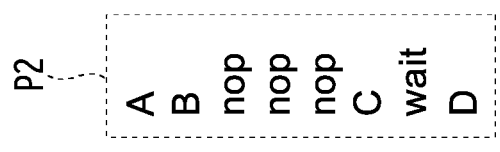
Figure 8A:

FIGS. 8A to 8C are diagrams illustrating a method of deleting the unnecessary nop instruction and the unnecessary wait instruction. Whether the nop instruction or the wait instruction is unnecessary is determined from the viewpoint of whether the execution result of the instruction sequence does not change even when the nop instruction and the wait instruction is deleted.

For example, even when the two consecutive nop instructions of the candidate P1 are deleted, since the instruction A completes before the instruction D starts, the data hazard due to the dependency between the instructions A and D does not occur, and hence the execution result does not change before and after the deletion. Therefore, the deletion unit 43 deletes the two consecutive nop instructions in the candidate P1.

On the other hand, when the wait instruction of the candidate P1 is deleted, the instruction C starts before the instruction B completes. Since the instructions B and C have the dependency as described above, when the wait instruction is deleted in this way, an instruction sequence having a different execution result than that of the original instruction sequence is unsuccessfully obtained. Therefore, the deletion unit 43 does not delete the wait instruction in the candidate P1.

In the same manner as the candidate P1, the deletion unit 43 determines whether the nop instruction and the wait instruction in the candidates P2 and P3 can be deleted. Then, the deletion unit 43 deletes these instructions, when the deletion unit 43 determines that these instructions can be deleted.

For example, the execution result of the candidate P2 changes before and after deleting the nop instruction or the wait instruction, and hence these instructions are not deleted from the candidate P2. In contrast, since the execution result of the candidate P3 does not change even when the second wait instruction is deleted, the deletion unit 43 deletes the second wait instruction in the candidate P3.

The selection unit 44 (see FIG. 5) selects one candidate having the number of instructions equal to or less than a predetermined number No, and having the smallest number of execution cycles among the candidate P1 to P3 which are subjected the deletion as in FIGS. 8A to 8C.

When an instruction, such as rep instruction, having an upper limit number with respect to the number of subsequent instructions is used, the predetermined number No is set as the upper limit number. Even when the rep instruction is not used, the upper limit number may be set in advance to the number of instructions in order to reduce the memory usage, and such an upper limit number may be adopted as the predetermined number No. The selection method of the candidate will be described with reference to FIGS. 9A to 9C.

Figure 9A:
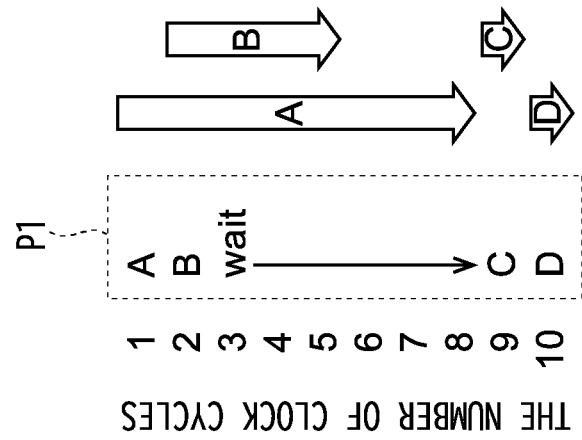
FIGS. 9A to 9C are diagrams schematically illustrating the number of execution cycles of the instruction sequences in the candidates according to the present embodiment.
Figure 9B:
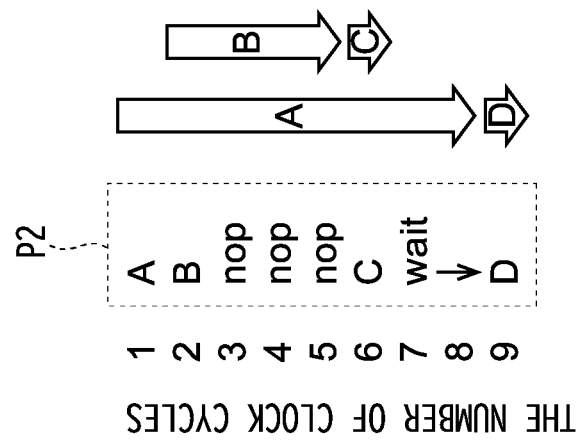
Figure 9C:
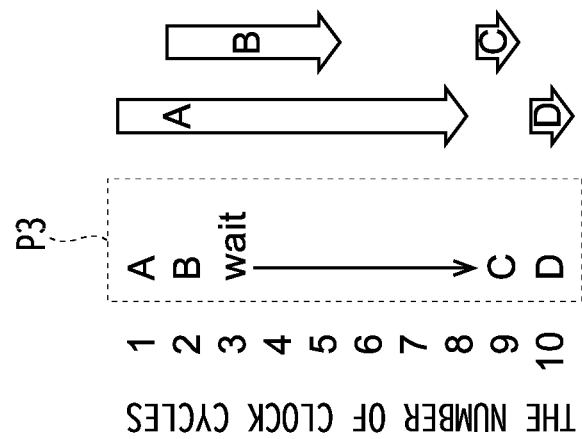

FIGS. 9A to 9C are diagrams schematically illustrating the number of execution cycles of the instruction sequences in the candidates P1 to P3.

The selection unit 44 calculates the number of execution cycles of the respective candidates P1 to P3 by using the number of cycles from the issuance of the instructions A, B, C and D to the completion thereof. The number of execution cycles of the candidate P1 calculated in this way becomes 10. Also, the number of execution cycles of the candidate P2 becomes 9, and the number of execution cycles of the candidate P3 becomes 10.

Further, the selection unit 44 calculates the number of instructions included in the respective instruction sequences of the candidates P1 to P3.

FIG. 10 is a diagram illustrating the number of execution cycles and the number of instructions obtained for each of the candidates P1 to P3.

In this example, it is assumed that the predetermined number No of the number of instructions is 8. In this case, the selection unit 44 selects the candidate P2, which has the smallest number of execution cycles among the candidates P1 to P3 that have the number of instructions equal to or less than the predetermined number No (=8).

The candidate P2 thus selected is the instruction sequence having the smallest number of execution cycles among the instruction sequences in which the data hazard does not occur. Therefore, when a binary file obtained by compiling the instruction sequence of the candidate P2 is executed in the target processor 1 (see FIG. 3), the occurrence of data hazard can be prevented and the execution speed of the program can be improved.

Then, the output unit 45 (see FIG. 5) outputs the instruction sequence of the candidate P2 as a final output result.

[Flowchart]

Figure 11:
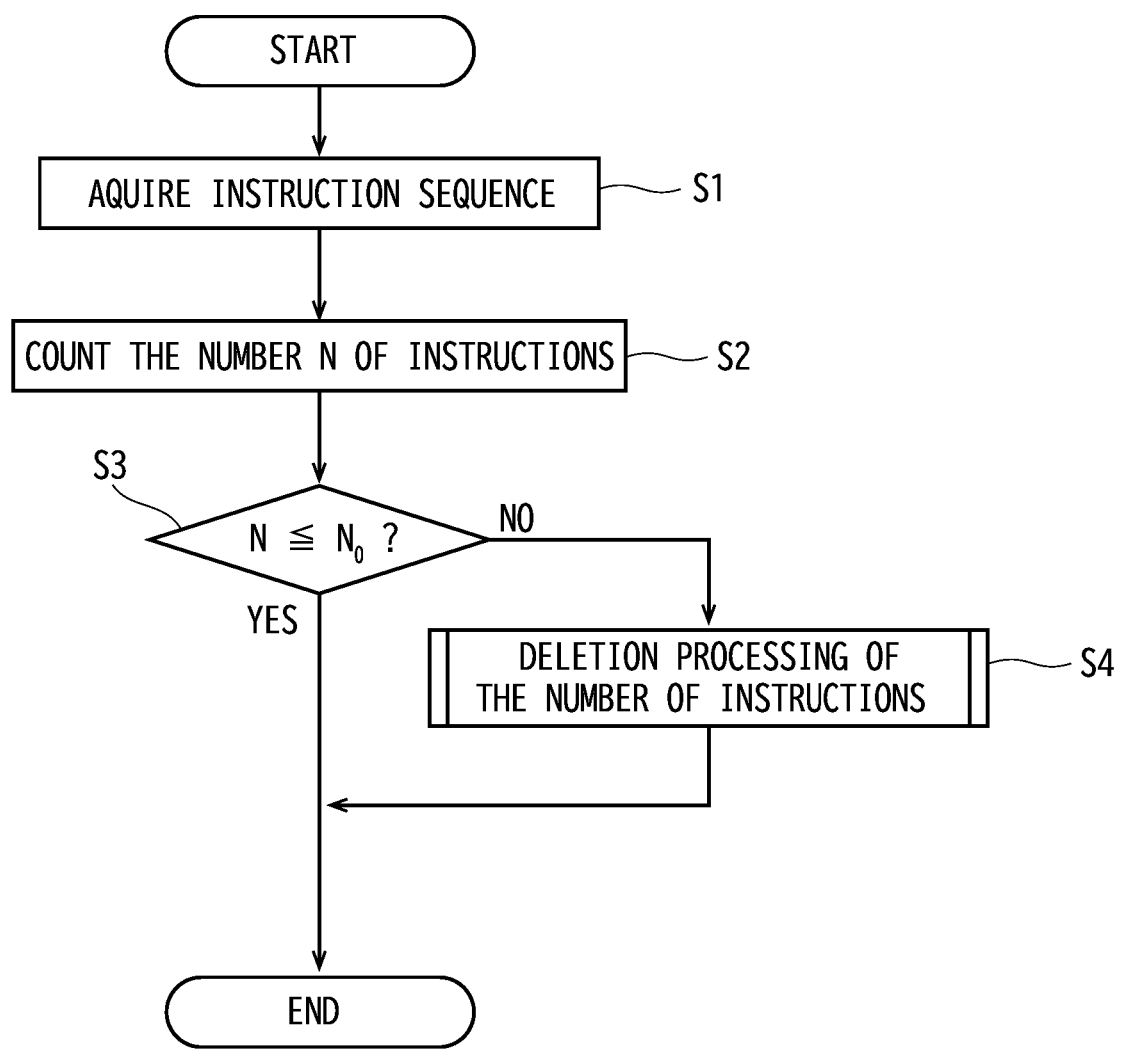
FIG. 11 is a flowchart illustrating an information processing method according to the present embodiment (part 1)

Next, a description will be given of an information processing method according to the present embodiment. FIG. 11 is a flowchart illustrating the information processing method according to the present embodiment.

First, the acquisition unit 41 acquires the instruction sequence 50 of FIG. 6 in step S1.

Next, the process proceeds to step S2, where the acquisition unit 41 counts the number N of instructions included in the instruction sequence 50.

Then, in step S3, the acquisition unit 41 determines whether the number N of the instructions is equal to or less than the predetermined number No. Here, when it is determined that the number N of the instructions is equal to or less than the predetermined number No (YES), there is no need to reduce the instruction in the instruction sequence 50. Therefore, the process ends successfully in this case.

On the other hand, when it is determined in step S3 that the number N of instructions is not equal to or less than the predetermined number No (NO), deletion processing of the number of instructions is executed in step S4.

Figure 12:
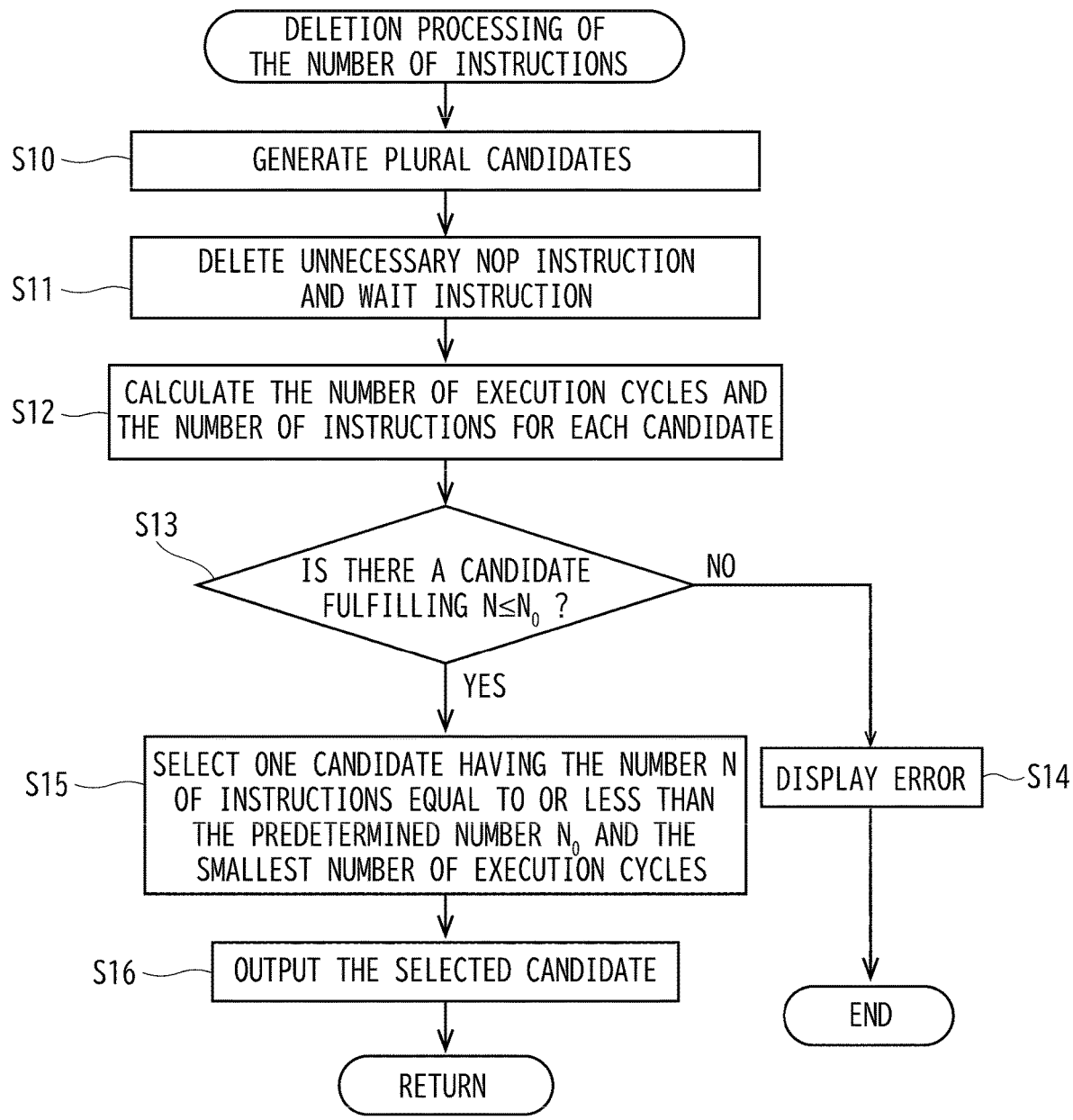
FIG. 12 is a flowchart illustrating an information processing method according to the present embodiment (part 2)

FIG. 12 is a flowchart illustrating the deletion processing of the number of instructions.

First, in step S10, the generation unit 42 generates the plurality of candidates P1 to P3 (see FIGS. 7A to 7C) of new instruction sequences having the same execution result as the instruction sequence 50.

Next, in step S11, the deletion unit 43 deletes the unnecessary nop instruction and the unnecessary wait instruction in each of the candidates P1 to P3, as illustrated in FIGS. 8A to 8C.

Then, in step S12, the selection unit 44 calculates the number of execution cycles and the number N of instructions of the instruction sequence for each of the candidates P1 to P3, as illustrated in FIG. 10.

Subsequently, in step S13, the selection unit 44 determines whether there is a candidate in which the number N of instructions is equal to or less than the predetermined number No among the candidates P1 to P3. When it is determined that there is no candidate in which the number N of instructions is equal to or less than the predetermined number No (NO), the output unit 45 outputs an error in step S14 and ends the process.

On the other hand, when it is determined in step S13 that there is the candidate in which the number N of instructions is equal to or less than the predetermined number No (YES), the process proceeds to step S15.

In step S15, the selection unit 44 selects one candidate having the number N of instructions equal to or less than the predetermined number No, and having the smallest number of execution cycles among the candidates P1 to P3. In the example in which the predetermined number No is 8 as in FIG. 10, the candidate P2 having a smaller number of execution cycles than any other candidates are selected.

After that, the process proceeds to step S16, where the output unit 45 outputs the candidate P2 selected in step S15.

Thus, the basic steps of the information processing method according to the present embodiment are completed.

According to the present embodiment, in step S10, the generation unit 42 generates the candidates P1 to P3 of new instruction sequences in which the part of the plurality of nop instructions is replaced with the wait instructions. Then, in step S11, the deletion unit 43 deletes the unnecessary nop instruction and the unnecessary wait instruction from the instruction sequence of each of the candidates P1 to P3. In step S15, the selection unit 44 selects the candidate having the number N of instructions equal to or less than the predetermined number No and the smallest number of execution cycles among the candidates P1 to P3 which is subjected to the deletion of the unnecessary nop instruction and the unnecessary wait instruction.

The instruction sequence selected in this way has the same execution result as the original instruction sequence 50 but has a smaller number of instructions than the original instruction sequence 50. Therefore, the instruction, such as the rep instruction, having the upper limit number with respect to the subsequent instructions can be used. Moreover, even when the rep instruction is not used, the memory usage can be decreased by reducing the number of instructions.

In addition, the selection unit 44 selects the candidate having the smallest number of execution cycles among the plurality of candidates having the number N of instructions equal to or less than the predetermined number No. Therefore, technical improvement in reducing the execution time of the program can be achieved.

Figures 13A, 13B:
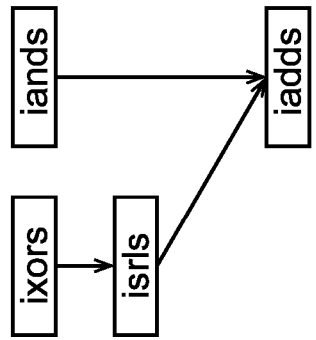
FIG. 13A is a diagram illustrating an example of the instruction sequence according to the present embodiment.
FIG. 13B is a diagram illustrating dependency of respective instructions included in the instruction sequence.

Next, a description will be given of a more specific example of the present embodiment. FIG. 13A is a diagram illustrating an instruction sequence 60 according to this example. In this example, the instruction sequence 60 used in the DLU of 8 SIMD (Single Instruction Multiple Data) will be described.

The instruction sequence 60 is an instruction sequence that forms a basic block inside the loop process. Here, the loop process which calculates an average value of respective elements of two vectors is considered. Note that the element of each vector is a 32-bit unsigned integer, and the number of elements of each vector is 8×128. The meaning of each instruction in the instruction sequence 60 is as follows.

%xor_xy=ixors %x, %y . . . Write the logical exclusive OR of the contents of a register "x" and a register "y" to a register "xor_xy".

%and_xy=iands %x, %y . . . Write the logical AND of the contents of the register "x" and the register "y" to a register "and_xy".

%srl_xor_xy=isrls %xor_xy, 1 . . . Logically shift the contents of the register "xor_xy" to the right by 1 bit, and write the result to a register "srl_xor_xy".

%res=iadds %and_xy, %srl_xor_xy . . . Write the arithmetic sum of the contents of the register "and_xy" and the register "srl_xor_xy" to a register "res".

In this example, the 8 SIMD is considered as described above, and the numbers of all the registers are automatically shifted by 8 every time the instruction sequence 60 is executed. By repeatedly executing the instruction sequence 60 by 128 times, the average values of 8×128 elements are written in the register "res" while the number of the register "res" is shifted by 8.

FIG. 13B is a diagram illustrating the dependency of the respective instructions included in the instruction sequence 60.

In this example, arrows are provided between the instructions having the dependency. The direction of each arrow indicates an order of appearance of each instruction in the instruction sequence 60. For example, the iadds instruction appears in the instruction sequence after the iands instruction appears.

All the instructions appearing in FIG. 13A are completed in 8 clock cycles except for the nop instructions.

Therefore, when six nop instructions are inserted between the iands instruction and the isrls instruction as illustrated in FIG. 13A, the isrls instruction starts after 8 clock cycles elapsed since the first ixors instruction started. Thereby, the data hazard due to the dependency of ixors and the isrls can be avoided.

Similarly, since seven nop instructions are inserted between the isrls instruction and the iadds instruction, the iadds instruction starts after 8 clock cycles elapsed since the isrls instruction started. As a result, the data hazard due to the dependency of the isrls and the iadds instructions can be avoided.

As described above, there is the rep instruction as an instruction for repeatedly executing the instruction sequence 60. However, while the upper limit of the number of subsequent instructions that can be repeatedly executed by the rep instruction is 12, the number of instructions in the instruction sequence 60 is 17. Therefore, in this state, the instruction sequence 60 cannot be repeatedly executed by the rep instruction.

In such a case, the information processing method according to the present embodiment illustrated in FIGS. 11 and 12 may be applied to the instruction sequence 60 to reduce the number of instructions.

FIG. 14A is a diagram illustrating an instruction sequence 71 in which the number of instructions is reduced by applying the present embodiment to the instruction sequence 60.

The number of instructions in the instruction sequence 71 is 11, which is less than the upper limit (=12) of the number of subsequent instructions that can be executed by the rep instruction. Therefore, the instruction sequence 71 can be repeatedly executed by the rep instruction. In this case, the output unit 45 adds the rep instruction to the instruction sequence 71, and outputs the instruction sequence 71 added with the rep instruction, for example. Thus, the intermediate code having the loop processing in which the instruction sequence 71 is repeated by the number of times assigned by the second argument of the rep instruction can be obtained. In this example, since the number of repeats is 128 as described above, the second argument of the rep instruction is 128. Further, the first argument of the rep instruction is 11, which indicates the number of instructions in the instruction sequence 71 to be repeated.

FIG. 14B is a diagram illustrating an instruction sequence 72 according to a first comparative example.

The instruction sequence 72 according to the first comparative example is an instruction sequence obtained by replacing all consecutive nop instructions in the original instruction sequence 60 with the single wait instruction. Since the number of instructions in the instruction sequence 72 is 6, the instruction sequence 72 can be repeatedly executed by the rep instruction. When the rep instruction is used in this way, the first argument of the rep instruction is 6 which is the number of instructions in the instruction sequence 72, and the second argument is 128 which is the number of repeats.

FIG. 14C is a diagram illustrating an instruction sequence 73 according to a second comparative example.

The instruction sequence 73 according to the second comparative example is an instruction sequence that implements the loop process with the use of a jump instruction without reducing the number of instructions in the original instruction sequence 60.

In the second comparative example, a register "loop_cnt" in which the number of loops is written and a register "baseadr" in which a base address common to all the registers is written are used in order to realize the loop processing. Further, a register "inc" in which an increment value of the base address is written is also used. Since the 8 SIMD is considered in this example as described above, the increment value is 8.

The meaning of each instruction using these registers is as follows.

%loop_cnt=sub %loop_cnt, 1 . . . Decrease the number of loops written in the register "loop_cnt" by 1.

%baseadr=add %baseadr,%inc . . . Increase the base address written in the register "baseadr" by the increment value (=8) written in the register "inc".

bnzr %loop_cnt, LoopBegin . . . Jump to a label "LoopBegin" when the number of loops written in the register "loop_cnt" is not 0, and execute the subsequent instructions when the number of loops is 0.

FIG. 15 is a diagram illustrating the number of instructions included in each of the instruction sequence 71 according to the present embodiment, the instruction sequence 72 according to the first comparative example, and the instruction sequence 73 according to the second comparative example. FIG. 15 also illustrates the number of execution cycles when each of these instruction sequences executed once.

As illustrated in FIG. 15, the number of instructions in the present embodiment is less than the upper limit value (=12) of the number of subsequent instructions that can be executed by the rep instruction. Also, in the first comparative example, the number of instructions is less than the upper limit value. However, the number of execution cycles in the first comparative example is 22, which is larger than the number of execution cycles in the present embodiment.

Furthermore, in the second comparative example, both of the number of instructions and the number of execution cycles becomes larger than those in the present embodiment.

This result revealed that the present embodiment is effective in reducing the number of instructions and the number of execution cycles.

In the example of FIG. 14A, the number of instructions is less than the predetermined number No (=12) assigned to the rep instruction. However, depending on the original instruction sequence, there may be a case where a candidate having the number of instructions equal to or less than the predetermined number No does not exist even when the present embodiment is applied. In this case, the output unit 45 (see FIG. 5) may output the instruction sequence 73 that realizes the loop process with the use of the jump instruction as illustrated in FIG. 14C instead of displaying an error as in step S14 of FIG. 12. The instruction sequence 73 is an instruction sequence in which a sub instruction, an add instruction, and a bnzr instruction are added to the original instruction sequence 60 (FIG. 13A) as described above, and the instruction sequence 73 can obtain the same execution result as the case (FIG. 14A) where the rep instruction is used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing apparatus comprising:
    a memory; and
    a processor coupled to the memory and the processor configured to:
        acquire an instruction sequence including a plurality of instructions;
        generate a plurality of candidates of new instruction sequences capable of obtaining an execution result as same as in the instruction sequence, by replacing at least a part of a plurality of nop (no operation) instructions included in the instruction sequence with a wait instruction that waits for completion of all preceding instructions;
        delete any one of the nop instructions and the wait instruction from each of the new instruction sequences, when the execution result does not change in case any one of the nop instructions and the wait instruction is deleted from the new instruction sequences in the candidates; and
        select a one candidate among the plurality of candidates subjected to the delete, the one candidate having the number of instructions equal to or less than a certain number, and having a smallest number of execution cycles among the plurality of candidates.

2. The information processing apparatus as claimed in claim 1, wherein the processor is configured to replace consecutive nop instructions with a single wait instruction when the nop instructions continuously appear in the instruction sequence.

3. The information processing apparatus as claimed in claim 1, wherein the certain number is an upper limit number of subsequent instructions allowed by a repeat instruction that instructs repeat of the subsequent instructions.

4. The information processing apparatus as claimed in claim 3, wherein the processor is configured to add the repeat instruction to the instruction sequence of the selected candidate, where the repeat instruction being instructing a repeat of the instruction sequence, and the processor is configured to output the instruction sequence added with the repeat instruction.

5. The information processing apparatus as claimed in claim 3, wherein the processor is configured to output the instruction sequence added with an instruction capable of obtaining an execution result as same as the repeat instruction, when the candidate having the number of instructions equal to or less than the certain number does not exists.

6. A non-transitory computer-readable recording medium storing a program that causes a processor included in an information processing apparatus to execute a process, the process comprising:
    acquiring an instruction sequence including a plurality of instructions;
    generating a plurality of candidates of new instruction sequences capable of obtaining an execution result as same as in the instruction sequence, by replacing at least a part of a plurality of nop (no operation) instructions included in the instruction sequence with a wait instruction that waits for completion of all preceding instructions;
    deleting any one of the nop instructions and the wait instruction from each of the new instruction sequences, when the execution result does not change in case any one of the nop instructions and the wait instruction is deleted from the new instruction sequences in the candidates; and
    selecting a one candidate among the plurality of candidates subjected to the delete, the one candidate having the number of instructions equal to or less than a certain number, and including a smallest number of execution cycles among the plurality of candidates.

7. An information processing method executed by a processor included in an information processing apparatus to execute a process, the process comprising:
    acquiring an instruction sequence including a plurality of instructions;
    generating a plurality of candidates of new instruction sequences capable of obtaining an execution result as same as in the instruction sequence, by replacing at least a part of a plurality of nop (no operation) instructions included in the instruction sequence with a wait instruction that waits for completion of all preceding instructions;
    deleting any one of the nop instructions and the wait instruction from each of the new instruction sequences, when the execution result does not change in case any one of the nop instructions and the wait instruction is deleted from the new instruction sequences in the candidates; and
    selecting a one candidate among the plurality of candidates subjected to the delete, the one candidate having the number of instructions equal to or less than a certain number, and having a smallest number of execution cycles among the plurality of candidates.

* * * * *